(12) United States Patent
Shinada et al.

(10) Patent No.: US 11,977,059 B2
(45) Date of Patent: May 7, 2024

(54) DIELECTRIC BARRIER DISCHARGE IONIZATION DETECTOR AND GAS CHROMATOGRAPHY ANALYZER

(71) Applicants: SHIMADZU CORPORATION, Kyoto (JP); Osaka University, Suita (JP)

(72) Inventors: Kei Shinada, Kyoto (JP); Satoshi Matsuoka, Kyoto (JP); Katsuhisa Kitano, Suita (JP)

(73) Assignees: Shimadzu Corporation, Kyoto (JP); OSAKA UNIVERSITY, Suita (JP)

( * ) Notice: Subject to any disclaimer, the term of this patent is extended or adjusted under 35 U.S.C. 154(b) by 68 days.

(21) Appl. No.: 17/479,410

(22) Filed: Sep. 20, 2021

(65) Prior Publication Data
US 2022/0099636 A1 Mar. 31, 2022

(30) Foreign Application Priority Data

Sep. 29, 2020 (JP) .................... 2020-163184

(51) Int. Cl.
G01N 27/66 (2006.01)
G01N 27/70 (2006.01)
(Continued)

(52) U.S. Cl.
CPC .......... G01N 30/64 (2013.01); G01N 27/70 (2013.01); *G01N 2030/025* (2013.01)

(58) Field of Classification Search
CPC ........ G01N 27/68; G01N 27/70; G01N 27/64; G01N 27/66
See application file for complete search history.

(56) References Cited

U.S. PATENT DOCUMENTS

| 4,266,196 A * | 5/1981 | Kawazoe | G01N 27/66 313/231.71 |
| 2009/0267082 A1* | 10/2009 | Yamamoto | H01L 29/861 257/77 |

(Continued)

FOREIGN PATENT DOCUMENTS

| CN | 102087255 A | 6/2011 |
| CN | 107807193 A | 3/2018 |

(Continued)

OTHER PUBLICATIONS

Shinada et al., "Development of New Ionization Detector for Gas Chromatography by Applying Dielectric Barrier Discharge", Shimadzu Hyouron (Shimadzu Review), vol. 69, Nos. 3 and 4, Mar. 29, 2013, submitted with a machine translation.

(Continued)

*Primary Examiner* — Jamel E Williams
*Assistant Examiner* — Alex T Devito
(74) *Attorney, Agent, or Firm* — Muir Patent Law, PLLC

(57) ABSTRACT

A light source emits excitation light to discharge gas that flows through a dielectric tube. A ground electrode unit includes a first ground electrode and a second ground electrode arranged at a distance from each other in an axial direction of the dielectric tube. A high-voltage electrode is provided between the first ground electrode and the second ground electrode. A first distance between the first ground electrode and the high-voltage electrode is shorter than a second distance between the second ground electrode and the high-voltage electrode. A cover is provided on an outer wall of the dielectric tube at a position between the first ground electrode and the high-voltage electrode. The light source is arranged to emit excitation light such that an optical axis thereof is directed toward a position where the cover is not provided on the outer wall of the dielectric tube.

8 Claims, 7 Drawing Sheets

(51) Int. Cl.
  *G01N 30/64*   (2006.01)
  *G01N 30/02*   (2006.01)

(56) References Cited

U.S. PATENT DOCUMENTS

2011/0133746 A1    6/2011  Shinada et al.
2018/0059058 A1*   3/2018  Fan ..................... G01N 27/66
2018/0067079 A1    3/2018  Shinada et al.

FOREIGN PATENT DOCUMENTS

| | | |
|---|---|---|
| JP | 2010-060354 A | 3/2010 |
| JP | 2011-117854 A | 6/2011 |
| JP | 6675709 | 4/2020 |

OTHER PUBLICATIONS

First office action dated Jul. 12, 2023 for corresponding application CN202111119114.4.
Office Action with a mailing date of Jan. 4, 2024, issued in relation to corresponding patent application CN 202111119114.4.

\* cited by examiner

DIELECTRIC BARRIER DISCHARGE IONIZATION DETECTOR AND GAS CHROMATOGRAPHY ANALYZER

BACKGROUND OF THE INVENTION

Field of the Invention

The present disclosure relates to a dielectric barrier discharge ionization detector and a gas chromatography analyzer.

Description of the Background Art

Various types of detectors such as a thermal conductive detector (TCD), an electron capture detector (ECD), and a flame ionization detector (FID) have been proposed and put into practical use as a trace gas detector for gas chromatography (GC). Detectors that generate an excited species of inert gas (He, $N_2$, Ar, Ne, and Xe) with plasma generated in high-voltage discharge to ionize a sample with vacuum ultraviolet light generated at the time when the excited species returns to a ground state have also been proposed for a long time. Among these, a dielectric barrier discharge ionization detector using low-frequency dielectric barrier discharge has recently been developed. The dielectric barrier discharge ionization detector (BID) uses dielectric barrier discharge with a surface of an electrode being covered with a dielectric (see, for example, Japanese Patent Laying-Open No. 2010-60354).

In dielectric barrier discharge, it may be difficult to reliably start discharge simply by applying a high voltage to an electrode. In Japanese Patent Laying-Open No. 2011-117854, start of discharge is expedited by emitting excitation light from a light source such as an LED from the outside of a dielectric tube.

SUMMARY OF THE INVENTION

Plasma discharge characteristics are different depending on a type of discharge gas to be used. In view of this, arrangement of a plurality of electrodes on the outside of the dielectric tube can be adjusted as appropriate. This in turn may cause a distance between electrodes to be short and discharge may occur on the outside of a dielectric as well as in the inside. In order to prevent this, a cover may be provided on an outer wall of the dielectric tube. In such an arrangement to provide the light shield on the outer wall of the dielectric tube, however, an arrangement for emitting excitation light has not conventionally sufficiently been studied.

The present disclosure was made to solve the problem described above, and an object thereof is to provide a dielectric barrier discharge ionization detector in which excitation light is reliably emitted to discharge gas in an arrangement where a cover is provided on an outer wall of a dielectric tube.

A dielectric barrier discharge ionization detector according to one aspect of the present disclosure includes a dielectric tube, a high-voltage electrode, a ground electrode unit, a voltage applicator, a light source, and an electric charge collection portion. The dielectric tube defines a gas flow channel through which discharge gas flows, and extends in an axial direction. The high-voltage electrode is provided on an outer wall of the dielectric tube. The ground electrode unit is electrically grounded and provided on the outer wall of the dielectric tube. The voltage applicator is connected to the high-voltage electrode and applies an alternating-current (AC) voltage across the high-voltage electrode and the ground electrode unit to cause discharge in the dielectric tube and to generate plasma from discharge gas. The light source emits excitation light to discharge gas that flows through the dielectric tube. The electric charge collection portion includes a collection electrode that collects ions generated by light from the plasma, the ions being generated from a sample component in sample gas introduced in the gas flow channel. The ground electrode unit includes a first ground electrode and a second ground electrode arranged at a distance from each other in an axial direction of the dielectric tube. The high-voltage electrode is provided between the first ground electrode and the second ground electrode. A first distance between the first ground electrode and the high-voltage electrode is shorter than a second distance between the second ground electrode and the high-voltage electrode. A cover is provided on the outer wall of the dielectric tube at a position between the first ground electrode and the high-voltage electrode. The light source is arranged to emit excitation light such that an optical axis of the light source is directed toward a position where the cover is not provided on the outer wall of the dielectric tube.

A dielectric barrier discharge ionization detector according to another aspect of the present disclosure includes a dielectric tube, a high-voltage electrode, a ground electrode, a voltage applicator, a light source, an electric charge collection portion, a light shield member, and a transmissive member. The dielectric tube defines a gas flow channel through which discharge gas flows, and extends in an axial direction. The high-voltage electrode is provided on an outer wall of the dielectric tube. The ground electrode is electrically grounded and provided on the outer wall of the dielectric tube. The voltage applicator is connected to the high-voltage electrode and applies an AC voltage across the high-voltage electrode and the ground electrode to cause discharge in the dielectric tube and to generate plasma from discharge gas. The light source emits excitation light to discharge gas that flows through the dielectric tube. The electric charge collection portion includes a collection electrode that collects ions generated by light from the plasma, the ions being generated from a sample component in sample gas introduced in the gas flow channel. The light shield member is provided on the outer wall of the dielectric tube and opaque to excitation light. The transmissive member is provided on the outer wall of the dielectric tube at a position different from a position of the light shield member in the axial direction of the dielectric tube, and transparent to excitation light. The light source is arranged to emit excitation light such that an optical axis of the light source is directed toward a position where the light shield member is not provided on the outer wall of the dielectric tube.

A gas chromatography analyzer according to another aspect of the present disclosure includes a dielectric barrier discharge ionization detector and an analysis column that separates a sample component in sample gas for each component. The sample component separated by the analysis column is introduced in the gas flow channel of the dielectric barrier discharge ionization detector.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
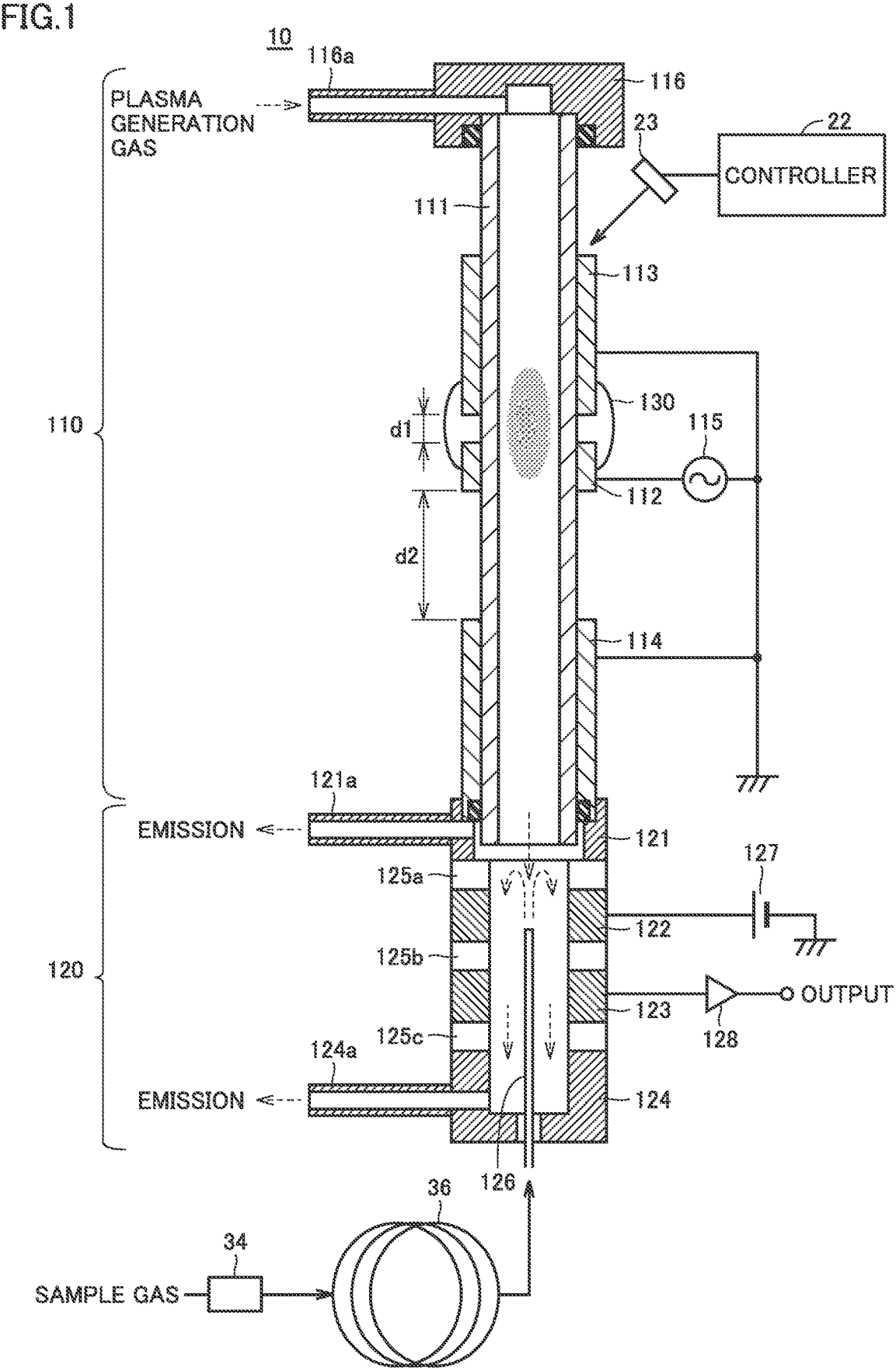
FIG. 1 is a schematic diagram of a configuration of a gas chromatography analyzer including a dielectric barrier discharge ionization detector according to the present embodiment.

An embodiment of the present disclosure will be described below in detail with reference to the drawings. The same or corresponding elements in the drawings have the same reference characters allotted and description thereof will not be repeated.

Various types of detectors such as a TCD and an ECD have been proposed and put into practical use as a trace gas detector for gas chromatography (GC). Among such detectors, an HD has currently most generally been used. The HD achieves a wide dynamic range (approximately seven orders of magnitude) by ionizing a gas sample by hydrogen flame and measuring an ionized current.

Detectors that generate an excited species of inert gas (He, $N_2$, Ar, Ne, and Xe) with plasma generated by high-voltage discharge to ionize a sample with vacuum ultraviolet light generated at the time when the excited species returns to a ground state have also been proposed for a long time. A barrier discharge ionization detector (BID) using low-frequency dielectric barrier discharge that has recently been developed is less in emission of thermions and secondary electrons as in use of a metal electrode, by using dielectric barrier discharge with a surface of an electrode being covered with a dielectric. By generating non-equilibrium plasma very low in neutral gas temperature (substantially without heat generation) with a low-frequency high-voltage power supply, generation of impurity gas by heating of a material for an inner wall is suppressed, a highly stable discharging state is created, and a high SN ratio is achieved (See Literature: Shinada et. al., "Yudentai Baria Houden wo Ouyou shita Gas Chromatography you Shinki Ion-ka Kenshutsuki no Kaihatsu (Development of New Ionization Detector for Gas Chromatography by Applying Dielectric Barrier Discharge)," Shimadzu Hyouron (Shimadzu Review), Vol. 69, Nos. 3 and 4, Mar. 29, 2013). In general, dielectric barrier discharge refers to a general arrangement in which "any" of a high-voltage electrode and a ground electrode is covered with a dielectric. The literature above shows that the SN ratio is improved by configuring both of the high-voltage electrode and the ground electrode as being covered with a dielectric.

Among inert gases mentioned previously, in particular, He gas and Ar gas (or He gas to which a trace amount of Ar gas is added) are often practically used as discharge gas in such a dielectric barrier discharge ionization detector. Reasons therefor are as explained in (A) and (B) below.

(A) Energy of discharge light from He gas is very high (approximately 17.7 eV). Therefore, most of compounds other than Ne and He can be ionized and detected. Since the FID is unable to ionize (detect) an inorganic substance, it is particularly useful for detection of an inorganic substance.

(B) Energy of discharge light from Ar gas (or He gas to which a trace amount of Ar gas is added) is approximately 11.7 eV, and hence an inorganic substance cannot be ionized (detected) as in the case of the FID. This characteristic is advantageous in that, when discharge gas is tailored to detection of an organic substance, for example, in detection of a trace amount of the organic substance in an aqueous solution, discharge gas is not sensitive to water which is a solvent (and hence very large in amount) and aimed detection of the trace amount of the organic substance is facilitated.

Since discharge characteristics are different depending on gas species, an optimal arrangement of electrodes (a width of an electrode or a distance between electrodes) in the BID is also different. When He and Ar are compared with each other, Ar is generally higher in voltage for starting discharge. According to the Paschen's law, a discharge starting voltage of Ar at the atmospheric pressure is approximately twice as high as that of He. In other words, for operations at the same discharge starting voltage, a distance between electrodes should be equal to or shorter than ½ for Ar.

The Paschen's law is a rule of thumb for spark discharge. Therefore, in dielectric barrier discharge used in the BID, a parameter such as a material of a dielectric, a purity of gas (an amount of an impurity), a frequency of a discharge power supply, and a waveform of the power supply is also relevant, and hence it is difficult to expect an optimal shape of the electrode or a condition for discharge. With a condition being the same, a distance between the electrodes should be shorter (or a discharge voltage should be higher) for Ar than for He.

In particular in the case of dielectric barrier discharge, however, even when the condition as above is set, it may be difficult to reliably start discharge simply by applying a high voltage to the electrode. In discharge with He, start of discharge is expedited by emitting excitation light from an LED or the like from the outside of the dielectric tube (Japanese Patent Laying-Open No. 2011-117854). In discharge with Ar, however, even when a blue or green LED light source similar to the former is used, a discharge start effect is not obtained.

In the BID in which Ar gas is used, in order to stabilize a baseline of a detection signal provided from a current amplifier, three electrodes should be arranged to satisfy relation of "a distance between upstream electrodes d1<a discharge start distance<a distance between downstream electrodes d2" (FIG. 1 in Japanese Patent No. 6675709).

Plasma discharge characteristics are thus different depending on a type of discharge gas to be used. In view of this, arrangement of a plurality of electrodes on the outside of the dielectric tube can be adjusted as appropriate. This in turn may cause a distance between electrodes to be short and discharge may occur on the outside of a dielectric as well as in the inside. In order to prevent this, a cover may be provided on an outer wall of the dielectric tube. In such an arrangement to provide the light shield on the outer wall of the dielectric tube, however, an arrangement for emitting excitation light has not conventionally sufficiently been studied.

A dielectric barrier discharge ionization detector according to the present embodiment is configured to solve such a problem, and detailed description will be given below with reference to the drawings. FIG. 1 is a schematic diagram of a configuration of a gas chromatography analyzer including the dielectric barrier discharge ionization detector according to the present embodiment.

As shown in FIG. 1, the gas chromatography analyzer includes a dielectric barrier discharge ionization detector (BID) 10, a sample introduction portion 34, and an analysis column 36. The gas chromatography analyzer transports a sample to sample introduction portion 34 over carrier gas and thereafter transports the sample to analysis column 36. Analysis column 36 separates a sample component in sample gas for each component. Then, the gas chromatography analyzer introduces the sample component separated by analysis column 36 into a gas flow channel of dielectric barrier discharge ionization detector 10.

Dielectric barrier discharge ionization detector 10 is a detector that detects a sample component separated by the gas chromatography analyzer. Dielectric barrier discharge ionization detector 10 includes a dielectric tube (which is also referred to as a "dielectric cylindrical tube") 111, a high-voltage electrode 112, a ground electrode unit, a voltage applicator (which is also referred to as an "excitation high-voltage AC power supply") 115, a controller 22, and a light source 23. The ground electrode unit includes a ground electrode 113 and a ground electrode 114 arranged at a distance from each other in an axial direction of the dielectric tube.

Dielectric tube 111 defines a gas flow channel through which discharge gas (which is also referred to as "plasma generation gas") flows and extends in the axial direction. For example, any one of helium (He), argon (Ar), nitrogen ($N_2$), neon (Ne), and xenon (Xe) or mixture gas thereof should only be employed as plasma generation gas. In the present embodiment, argon (Ar) gas is employed as plasma generation gas. For the sake of convenience of description, up and down directions are defined below with an upstream side in a direction of flow of gas (a direction shown with a downward arrow in FIG. 1) in dielectric cylindrical tube 11 being defined as up and a downstream side being defined as down, however, this definition does not limit a direction in using the BID.

An annular electrode (electrodes 112, 113, and 114) composed of a conductor such as SUS or copper is provided around an outer wall surface of dielectric cylindrical tube 111 along a direction of flow of gas. Electrode 112 is also referred to as the "high-voltage electrode," electrode 113 is also referred to as an "upstream-side ground electrode" or a "first ground electrode," electrode 114 is also referred to as a "downstream-side ground electrode" or a "second ground electrode," and these electrodes are also collectively referred to as a "plasma generation electrode."

Excitation high-voltage AC power supply 115 is connected to high-voltage electrode 112 and high-voltage electrode 112 is provided on an outer wall of dielectric tube 111. Ground electrodes 113 and 114 are electrically grounded and provided on the outer wall of dielectric tube 111. The ground electrode includes two ground electrodes of first ground electrode (upstream-side ground electrode) 113 and second ground electrode (downstream-side ground electrode) 114. High-voltage electrode 112 is provided between first ground electrode 113 and second ground electrode 114.

Excitation high-voltage AC power supply 115 applies an AC voltage across high-voltage electrode 112 and ground electrodes 113 and 114 in order to cause discharge in dielectric tube 111 and to generate plasma from plasma generation gas (argon gas). Excitation high-voltage AC power supply 115 generates a high AC voltage approximately from 5 kV to 10 kV at a frequency within a range from 1 kHz to 100 kHz and further preferably approximately from 5 kHz to 30 kHz (low frequency). The AC voltage may have any of a sinusoidal waveform, a rectangular waveform, a triangular waveform, and a sawtooth waveform.

In the BID in the present embodiment, a region above a lower end of downstream-side ground electrode 114 in FIG. 1 is referred to as a discharge portion 110 and a region below the lower end of downstream-side ground electrode 114 is referred to as an electric charge collection portion 120.

A gas supply tube 116a is connected to a tube tip end member 116 provided at an upper end of dielectric cylindrical tube 111, and plasma generation gas (argon gas in the present embodiment) that also serves as diluent gas is supplied into dielectric cylindrical tube 111 through gas supply tube 116a. Since a wall surface of dielectric cylindrical tube 111 is present between plasma generation electrodes 112, 113, and 114 and plasma generation gas, the wall surface itself functions as a dielectric cover layer that covers surfaces of plasma generation electrodes 112, 113, and 114 and allows dielectric barrier discharge.

Downstream from dielectric cylindrical tube 111, a connection member 121 which is a cylindrical body identical in inner diameter, a bias electrode 122, and a collection electrode 123 are arranged along a direction of flow of gas with insulators 125a and 125b such as alumina or a PTFE resin being interposed. Downstream from collection electrode 123, a tube terminal end member 124 in a cylindrical shape with bottom is arranged with an insulator 125c being interposed. An internal space defined by connection member 121, bias electrode 122, collection electrode 123, tube terminal end member 124, and insulators 125a, 125b, and 125c communicates with an internal space in dielectric cylindrical tube 111.

A bypass exhaust tube 121a through which some of plasma generation gas is emitted to the outside is connected to a circumferential surface of connection member 121, and a sample exhaust tube 124a is connected to a circumferential surface of tube terminal end member 124. A sample introduction tube 126 small in diameter is inserted in a lower surface of tube terminal end member 124, and sample gas is supplied into electric charge collection portion 120 through sample introduction tube 126. The electric charge collection portion is heated to approximately 450° C. at the highest by a not-shown external heater in order to maintain a vaporized state of sample gas.

Connection member 121 is grounded and functions as a recoil electrode for preventing electrically charged particles in plasma that move over a gas flow from reaching collection electrode 123. Bias electrode 122 is connected to a bias direct-current (DC) power supply 127 and collection electrode 123 is connected to a current amplifier 128.

An operation for detecting a sample component contained in sample gas in the BID will generally be described. As shown with an arrow pointing to the right in FIG. 1, plasma generation gas also serving as diluent gas is supplied into dielectric cylindrical tube 111 through gas supply tube 116a. Plasma generation gas flows downward through dielectric cylindrical tube 111. Some of plasma generation gas is emitted to the outside through bypass exhaust tube 121a and a remainder flows downward through the electric charge collection portion as diluent gas and is emitted to the outside through sample exhaust tube 124a. Sample gas containing a sample component is supplied through sample introduction tube 126 and discharged into the electric charge collection portion through a sample gas discharge outlet at a terminal end. Though sample gas is discharged from the sample gas discharge outlet in a direction reverse to a direction of flow of diluent gas, sample gas is soon pushed back as shown with an arrow in FIG. 1, and sample gas merges with diluent gas and travels downward.

While plasma generation gas flows through dielectric cylindrical tube 111, excitation high-voltage AC power supply 115 applies a high AC voltage across high-voltage electrode 112 and upstream-side ground electrode (first ground electrode) 113 and across high-voltage electrode 112 and downstream-side ground electrode (second ground electrode) 114. Dielectric barrier discharge thus occurs in dielectric cylindrical tube 111, plasma generation gas is ionized, and plasma (atmospheric-pressure non-equilibrium plasma) is generated.

Collection electrode 123 collects ions generated by light from plasma, the ions being generated from the sample component in sample gas introduced into the gas flow channel. Specifically, excitation light from atmospheric-pressure non-equilibrium plasma passes through discharge portion 110 and electric charge collection portion 120 and reaches a portion where sample gas is present and ionizes the sample component in sample gas. Thus generated ions move toward collection electrode 123 owing to action of electric field formed by a DC voltage applied to bias electrode 122 and supply and receive electrons at collection electrode 123.

An ion current in accordance with an amount of ions derived from the sample component and generated by the action of excitation light, that is, an amount of the sample component, is provided to current amplifier 128, which amplifies the ion current and provides a detection signal. Thus, in the BID according to the present embodiment, a detection signal in accordance with an amount (concentration) of the sample component contained in sample gas introduced through sample introduction tube 126 is provided.

Basic constituent elements of the BID in the present embodiment are the same as those in a general BID. In addition, basic detection operations described above are the same as those of the general BID. A structural feature of the BID according to the present embodiment resides in that a distance between high-voltage electrode 112 and upstream-side ground electrode 113 (which is referred to as a "distance between upstream-side electrodes" below) d1 is shorter than a discharge start distance therebetween and a distance between high-voltage electrode 112 and downstream-side ground electrode 114 (which is referred to as a "distance between downstream-side electrodes" below) d2 is longer than the discharge start distance therebetween. In other words, in the present embodiment, the distance between upstream-side ground electrode 113 and high-voltage electrode 112 (distance between upstream-side electrodes d1) is shorter than the distance between downstream-side ground electrode 114 and high-voltage electrode 112 (distance between downstream-side electrodes d2). Since the discharge start distance is dependent on a parameter such as a frequency of the low-frequency AC voltage, an amplitude of the voltage, a waveform of the power supply, a type and a concentration of plasma generation gas, and a material for dielectric cylindrical tube 111, distance between upstream-side electrodes d1 and distance between downstream-side electrodes d2 are adjusted as appropriate depending on these parameters.

For example, in a BID in which both of distances between electrodes d1 and d2 are shorter than the discharge start distance, discharge occurs not only between high-voltage electrode 112 and upstream-side ground electrode 113 but also between high-voltage electrode 112 and downstream-side ground electrode 114. When discharge occurs in both of these portions as such, a baseline of the detection signal provided from current amplifier 128 cannot be stabilized.

By setting distance between upstream-side electrodes d1 to be shorter than the discharge start distance and setting distance between downstream-side electrodes d2 to be longer than the discharge start distance as in the present embodiment, discharge can occur only between high-voltage electrode 112 and upstream-side ground electrode 113 when a low-frequency high AC voltage is applied across high-voltage electrode 112 and upstream-side ground electrode 113 and across high-voltage electrode 112 and downstream-side ground electrode 114 by excitation high-voltage AC power supply 115.

Since variation in position of a plasma generation region in dielectric cylindrical tube 111 is consequently suppressed, the baseline of the detection signal provided from current amplifier 128 can be stabilized and stable output can be obtained.

Features as described above are specific to an example where argon gas is employed as plasma generation gas. When helium gas is employed as plasma generation gas, an electrode does not necessarily have to be provided to satisfy relation of "distance between upstream-side electrodes d1<distance between downstream-side electrodes d2" as above.

In the present embodiment, dielectric cylindrical tube 111 has an outer diameter of 4 mm, an inner diameter of 2 mm, and a length of 164 mm and is composed of quartz. High-voltage electrode 112 has a length of 4 mm and upstream-side ground electrode 113 has a length of 14.5 mm. Distance between upstream-side electrodes d1 is 1.5 mm and distance between downstream-side electrodes d2 is 10 mm. A distance from the upper end of upstream-side ground electrode 113 to tube tip end member 116 is 20 mm. If distance between upstream-side electrodes d1 and distance between downstream-side electrodes d2 are each 1.5 mm, discharge occurs between the electrodes (that is, 1.5 mm is shorter than the discharge start distance). When distance between upstream-side electrodes d1 and distance between downstream-side electrodes d2 are each 10 mm, discharge does not occur between the electrodes (that is, 10 mm is longer than the discharge start distance).

Without being limited to distance between upstream-side electrodes d1 being shorter and distance between downstream-side electrodes d2 being longer, distance between upstream-side electrodes d1 may be longer and distance between downstream-side electrodes d2 may be shorter. In this case, distances between electrodes d1 and d2 are adjusted such that discharge in dielectric cylindrical tube 111 is limited to occur in a region between high-voltage electrode 112 and downstream-side ground electrode 114 in accordance with a parameter such as a frequency and an amplitude of the AC voltage applied by excitation high-voltage AC power supply 115, a type or a concentration of plasma generation gas, and a dielectric material for dielectric cylindrical tube 111. A dimension (unit of mm) shown above is merely by way of example and limitation thereto is not intended.

Dielectric cylindrical tube 111 is composed of a light transmissive dielectric such as quartz. Dielectric cylindrical tube 111 is formed from a quartz tube having an outer diameter of 4 mm. Light source 23 that emits light (excitation light) toward a circumferential surface of dielectric cylindrical tube 111 (actually, toward the plasma generation region in the gas flow channel) is provided on the outside of dielectric cylindrical tube 111, as a feature characteristic to dielectric barrier discharge ionization detector 10 in the present embodiment. In other words, light source 23 emits excitation light to plasma generation gas that flows through dielectric tube 111. In the present embodiment, excitation light emitted from light source 23 is light (ultraviolet light) including wavelengths not longer than 300 nm.

Light source 23 is, for example, an ultraviolet LED. A distance between light source 23 and an outer circumferential surface of dielectric cylindrical tube 111 is, for example, 10 mm (may be approximately from 10 mm to 15 mm). Controller 22 including a CPU and the like controls light source 23 to turn on and off. Controller 22 controls also an on and off operation of excitation high-voltage AC power supply 115.

While argon gas flows in the gas flow channel, excitation high-voltage AC power supply 115 is driven in response to a control signal from controller 22 and applies a low-frequency high AC voltage across plasma generation electrode 112 and electrodes 113 and 114. Controller 22 gives an instruction to turn on light source 23 at the same time with, a prescribed time period after, or a prescribed time period before, application of the voltage.

Quartz (synthetic quartz) which is a material for dielectric cylindrical tube 111 allows passage of wavelengths within a range approximately from 170 nm to 2200 nm. Therefore, light emitted from light source 23 passes through a circumferential wall of dielectric cylindrical tube 111 and impinges on argon gas that flows in the gas flow channel. Then, light energy excites argon molecules or molecules of a trace amount of impurity gas contained in argon gas, and when light energy exceeds ionization energy, photoionization occurs.

Discharge thus tends to occur in the plasma generation region lying between electrodes 112 and 113 in the gas flow channel. Therefore, even when the low-frequency AC voltage applied across electrode 112 and electrodes 113 and 114 is low to such an extent that discharge does not start normally (in a state without irradiation with light), discharge occurs between electrodes 112 and 113. Since this discharge occurs through a dielectric cover layer (dielectric cylindrical tube 111), it falls under dielectric barrier discharge. As a result of this dielectric barrier discharge, argon gas that flows in the gas flow channel is largely ionized and plasma (atmospheric-pressure non-equilibrium microplasma) is generated.

Excitation light and an excited species of argon emitted from atmospheric-pressure non-equilibrium microplasma generated as above reach a portion where sample gas is present through the gas flow channel and ionizes molecules (or atoms) of a sample component in sample gas.

Discharge is thus started as being triggered by irradiation with light from light source 23. A state that a prescribed voltage is applied by excitation high-voltage AC power supply 115 and a state that light source 23 is turned on (light is emitted) are controlled to overlap for a prescribed time period or longer. If only discharging is once started, irradiation with light is not required and light source 23 may be turned off at any time point.

The present embodiment is described as using argon gas as discharge gas (plasma generation gas). Without being limited as such, inert gas such as helium, nitrogen, neon, or xenon should only be used. When argon gas is used, light including wavelengths not longer than 300 nm should be emitted from the light source in order to start discharge. For example, when helium gas is used, however, discharge can be started also by employing a blue LED (having a wavelength of 470 nm), a green LED (having a wavelength of 520 nm), or an orange LED (having a wavelength of 592 nm) as the light source.

By supplying light energy equal to or higher than a certain level to the plasma generation region, discharge can be started. Since light energy is higher as the wavelength is shorter, the wavelength of emitted light is more preferably shorter.

An ultraviolet LED having a wavelength of 300 nm or 285 nm is employed in the present embodiment. Without being limited as such, a light source should only be able to emit light including wavelengths not longer than 300 nm. Instead of the LED, an ultraviolet lamp having a wavelength equal to or shorter than 300 nm used as a bactericidal lamp may be employed as light source 23.

In the present embodiment, a cover 130 is provided on the outer wall of dielectric tube 111 at a position between first ground electrode 113 and high-voltage electrode 112. As described previously, when the distance between the electrodes is short, discharge may occur also on the outside of the dielectric. In the present embodiment, the distance between high-voltage electrode 112 and first ground electrode 113 (distance between upstream-side electrodes d1) is short, and hence creeping discharge may occur along the outer wall of dielectric tube 11 therebetween (that is, a surface of the quartz tube that connects high-voltage electrode 112 and first ground electrode 113 to each other over the shortest distance). By providing cover 130 as shown in FIG. 1 such that the outer wall of dielectric tube 111 between high-voltage electrode 112 and first ground electrode 113 is not exposed to air, occurrence of creeping discharge on the outer wall of dielectric tube 111 can be suppressed. When cover 130 is provided, the shortest path along which creeping discharge from high-voltage electrode 112 to first ground electrode 113 occurs is a path along the surface of cover 130 in contact with air. In this case, however, the path is sufficiently longer than the discharge start distance and hence discharge on the outside does not occur. By thus providing cover 130 not to allow exposure to air, of the outer wall of dielectric tube 111 that connects first ground electrode 113 and high-voltage electrode 112 to each other over the shortest distance, occurrence of discharge on the outside of dielectric tube 111 is suppressed. Cover 130 is a member that cuts off ultraviolet light having a wavelength equal to or shorter than 300 nm. Therefore, even when excitation light is emitted to a position where cover 130 is provided, excitation light is cut off by cover 130 and discharge cannot occur. Cover 130 does not necessarily have to be a light shield material aiming to cut off light, and it may be a transparent or semitransparent member.

Under the circumstances as described above, light source 23 should emit excitation light such that an optical axis thereof is directed toward a position where cover 130 is not provided on the outer wall of dielectric tube 111. For example, light source 23 may be provided such that the optical axis shown with the arrow is directed toward a position around the upper end of upstream-side ground electrode 113 as in FIG. 1. A position where light source 23 is provided and an angle at which light source 23 is provided will be described below with reference to FIGS. 2 to 6.

FIGS. 2 to 5 are diagrams each showing an exemplary position where the light source is provided. As described above, light source 23 is arranged to emit excitation light such that the optical axis thereof is directed toward a position except for cover 130, specifically, a position where cover 130 is not provided on the outer wall of dielectric tube 111. Light source 23 should only emit excitation light such that the optical axis thereof is directed toward an end of first ground electrode (upstream-side ground electrode) 113 or an end of high-voltage electrode 112, on a side where cover 130 is not provided. Light source 23 should only emit, as being inclined, excitation light such that the optical axis thereof is directed toward a prescribed position between first ground electrode 113 and high-voltage electrode 112.

As described above, discharge occurs between upstream-side ground electrode 113 and high-voltage electrode 112. A position intermediate between upstream-side ground electrode 113 and high-voltage electrode 112 is called a "prescribed position." As the position irradiated with excitation light is closer to the prescribed position, discharge is more likely.

Therefore, essentially, light source 23 is desirably arranged such that the optical axis thereof is directed toward a position between upstream-side ground electrode 113 and high-voltage electrode 112 for irradiation of the prescribed position between upstream-side ground electrode 113 and high-voltage electrode 112. Cover 130, however, is provided between a part of the first ground electrode and the high-voltage electrode as described above. Therefore, even though light is emitted to this position, excitation light is cut off by cover 130 and discharge cannot be started.

Figure 2:
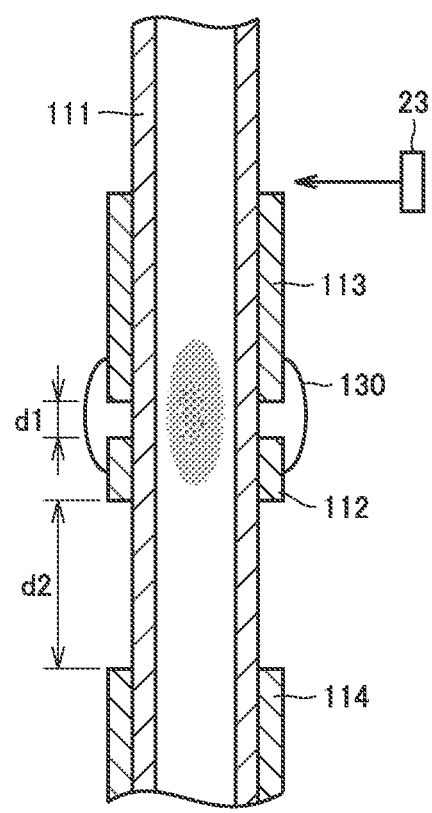
FIGS. 2 to 5 are diagrams each showing an exemplary position where a light source is provided.

Under such circumstances, light source 23 should emit excitation light such that the optical axis thereof is directed toward a position where cover 130 is not provided on the outer wall of dielectric tube 111. In this case, for example, as shown in FIG. 2, light source 23 emits excitation light such that the optical axis thereof is directed toward the end of upstream-side ground electrode 113 on the side where cover 130 is not provided. Specifically, light source 23 should only emit excitation light toward a position as close as possible to the upper end of upstream-side ground electrode 113 where dielectric cylindrical tube 111 is exposed. In the present embodiment, the distance between dielectric cylindrical tube 111 and light source 23 is set to 10 mm. In the example in FIG. 2, light source 23 is provided to horizontally emit excitation light.

Figure 3:
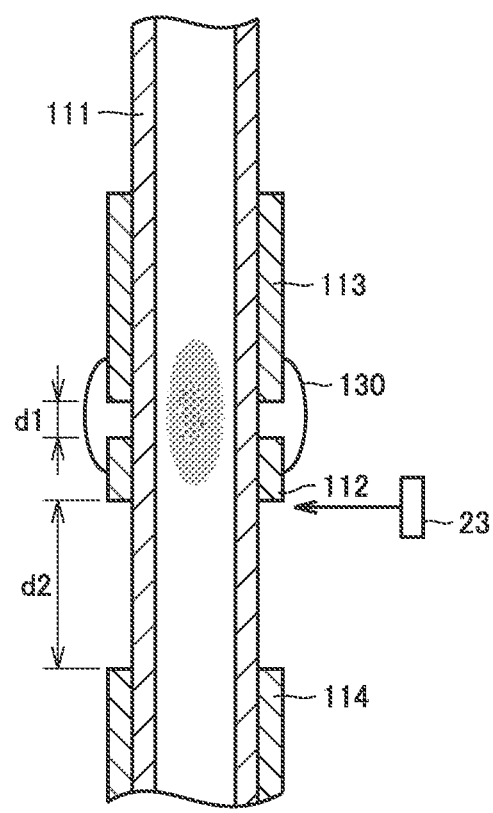

Alternatively, as shown in FIG. 3, light source 23 may emit excitation light such that the optical axis thereof is directed toward the end of high-voltage electrode 112 on the side where cover 130 is not provided. In the present embodiment, the distance between dielectric cylindrical tube 111 and light source 23 is set to 10 mm. Light source 23 is provided to horizontally emit excitation light to dielectric cylindrical tube 111.

Thus, excitation light is desirably emitted toward the upper end of upstream-side ground electrode 113 or the lower end of high-voltage electrode 112 as close as possible to the prescribed position, although this position is distant from the prescribed position. In the present embodiment, the lower end of high-voltage electrode 112 is closer to the prescribed position than the upper end of upstream-side ground electrode 113, and therefore excitation light is emitted toward the lower end of high-voltage electrode 112 as in FIG. 3 more desirably than in FIG. 2.

In consideration of a structure of the gas chromatography analyzer, it may be difficult to provide light source 23 at a position as in FIG. 2 or 3. In such a case, excitation light should only be emitted also toward a position as close as possible to the prescribed position, other than the position in FIG. 2 or 3.

In consideration of the structure of the gas chromatography analyzer, an angle at which light source 23 is provided may be restricted. In such a case, light source 23 does not have to be provided at the angle as shown in FIG. 2 or 3.

Light source 23 desirably emits, as being inclined, excitation light such that the optical axis thereof is directed toward the prescribed position between first ground electrode 113 and high-voltage electrode 112. At this time, light source 23 should only be inclined to emit excitation light to the position as close as possible to the prescribed position.

Figure 4:
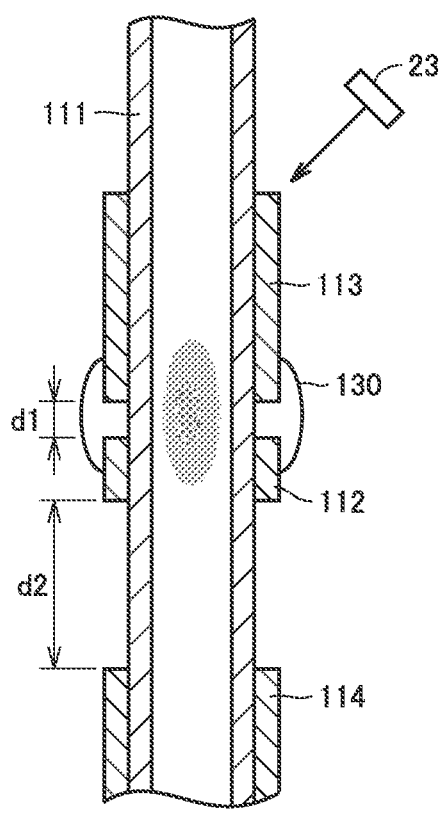

For example, as shown in FIG. 4, when excitation light is emitted from an upper end side of upstream-side ground electrode 113, light source 23 should only emit excitation light as being inclined downward for emission in a direction toward the prescribed position. By doing so, excitation light is emitted to a position as close as possible to the prescribed position. When light source 23 emits excitation light, for example, as being inclined upward at the position in FIG. 4, this position is distant from the prescribed position and hence it is not desirable to provide light source 23 at such an angle.

Figure 5:
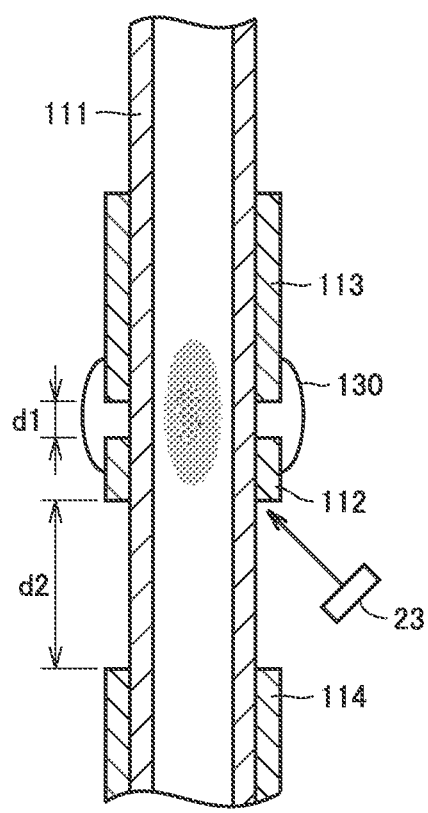

Alternatively, as shown in FIG. 5, when excitation light is emitted from a lower end side of high-voltage electrode 112, light source 23 should only emit excitation light as being inclined upward for emission in a direction toward the prescribed position. By doing so, excitation light is emitted to a position as close as possible to the prescribed position. For example, when light source 23 emits excitation light as being inclined downward at the position in FIG. 5, the position is distant from the prescribed position and it is not desirable to provide light source 23 at such an angle. Since the lower end of high-voltage electrode 112 is closer to the prescribed position than the upper end of upstream-side ground electrode 113 in the present embodiment, the light source emits excitation light as being inclined upward from the lower end of high-voltage electrode 112 as shown in FIG. 5 more desirably than in FIG. 4.

Figure 6:
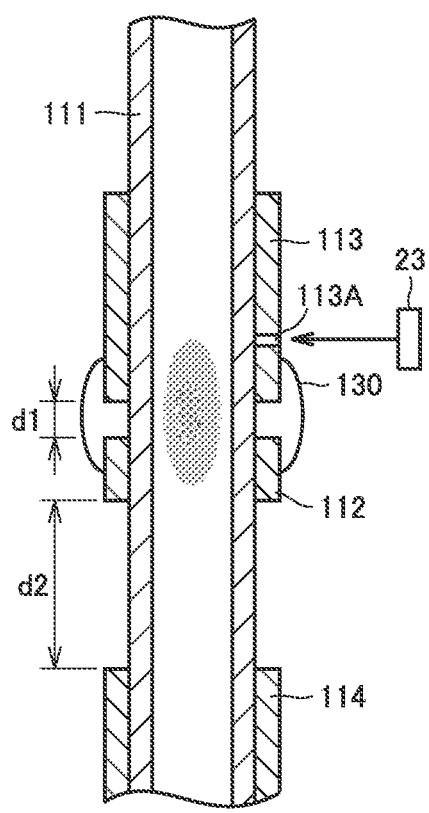
FIG. 6 is a diagram showing an exemplary position where the light source is provided when a ground electrode includes a hole.

An example in which the ground electrode includes a hole will now be described. FIG. 6 is a diagram showing an exemplary position where the light source is provided when the ground electrode includes a hole.

As shown in FIG. 6, first ground electrode 113 is assumed to include a hole 113A. Hole 113A should only be large enough for emission of excitation light into the inside of dielectric cylindrical tube 111. For example, hole 113A may have a diameter of approximately 1 mm.

Light source 23 emits excitation light such that the optical axis thereof is directed toward hole 113A. For example, light source 23 is provided at a position where it can emit excitation light toward hole 113A as in FIG. 6. When first ground electrode 113 includes such a hole 113A, this position is closer to the prescribed position than in emission to the upper end of first ground electrode 113, and this position is desirable as a position where the light source is to be provided.

Without being limited to the example in FIG. 6, a hole may be provided in first ground electrode 113 or high-voltage electrode 112 at a position where cover 130 is not provided and light source 23 may be provided at a position where it can emit excitation light toward the hole.

Figure 7:
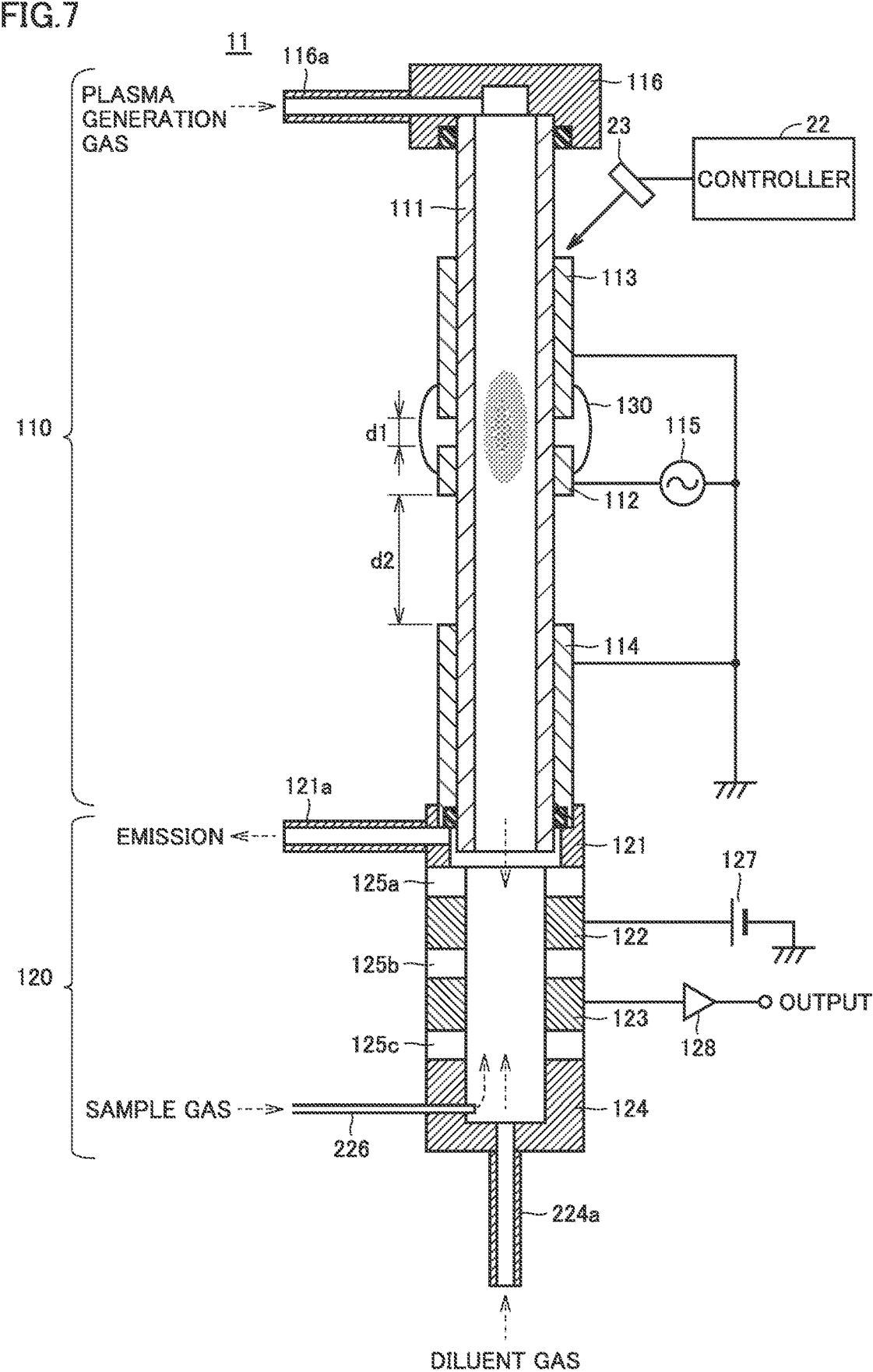
FIG. 7 is a schematic diagram of a configuration of a dielectric barrier discharge ionization detector according to a modification of the present embodiment.

FIG. 7 is a schematic diagram of a configuration of a dielectric barrier discharge ionization detector according to a modification of the present embodiment. The same constituent elements as in FIG. 1 in the present embodiment have the same reference numerals allotted and detailed description will not be given. In a dielectric barrier discharge ionization detector 11 in the modification, sample gas containing a sample component is supplied through a sample introduction tube 226 connected below collection electrode 123. An outlet of sample introduction tube 226 is located below collection electrode 123. Diluent gas is supplied through a diluent gas supply tube 224*a* connected below collection electrode 123. Plasma gas and diluent gas are both emitted from bypass exhaust tube 121*a*.

As shown with an arrow in FIG. 7, plasma gas flows downward through the plasma generation region, diluent gas flows upward through a current detection region, and they merge with each other and merged gas is emitted to the outside through bypass exhaust tube 121*a*. Since diluent gas and sample gas are mixed with each other around a lower end of the gas flow channel and they travel upward in this case, sample gas is sufficiently diluted around an upper portion of the current detection region. Therefore, even when a concentration of a sample in sample gas is high, no excessive generation of ions occurs and ions can be detected within a high-linearity concentration range. In this configuration, plasma generation gas may be different in type from diluent gas.

Dielectric barrier discharge ionization detectors 10 and 11 do not have to include downstream-side ground electrode 114 as the ground electrode. In this case, the dielectric barrier discharge ionization detector includes upstream-side ground electrode 113 and high-voltage electrode 112 but does not include downstream-side ground electrode 114 in FIG. 1 or 7. Alternatively, in this case, upstream-side ground electrode 113 and high-voltage electrode 112 may be arranged in relation reverse in up and down directions, but the configuration is otherwise similar to that in FIG. 1 or 7.

In this case, dielectric barrier discharge ionization detectors 10 and 11 may each include dielectric tube 111, high-voltage electrode 112, ground electrode 113, voltage applicator 115, light source 23, electric charge collection portion 120, and cover (which is also a "light shield member" below) 130. Dielectric tube 111 defines a gas flow channel through which discharge gas flows and extends in the axial direction. High-voltage electrode 112 is provided on the outer wall of dielectric tube 111. Ground electrode 113 is electrically grounded and provided on the outer wall of dielectric tube 111. Voltage applicator 115 is connected to high-voltage electrode 112 and applies an AC voltage across high-voltage electrode 112 and ground electrode 113 to generate discharge in dielectric tube 111 and to generate plasma from discharge gas. Light source 23 emits excitation light to discharge gas that flows through dielectric tube 111. Electric charge collection portion 120 includes collection electrode 123 that collects ions generated by light from plasma, the ions being generated from a sample component in sample gas introduced into the gas flow channel. Light shield member 130 is provided on the outer wall of dielectric tube 111. Light source 23 emits excitation light such that the optical axis thereof is directed toward a position where light shield member 130 is not provided on the outer wall of dielectric tube 111.

As shown in FIG. 1, light shield member 130 is provided between high-voltage electrode 112 and ground electrode 113. Light shield member 130 is opaque to excitation light and does not allow passage of ultraviolet light therethrough as described above. Therefore, excitation light should be emitted to a position as shown in FIGS. 2 to 6 where light shield member 130 is not provided on the outer wall of dielectric tube 111. Dielectric barrier discharge ionization detectors 10 and 11 may each include a transmissive member. The transmissive member is provided on the outer wall of dielectric tube 111 at a position different from the position of the light shield member in the axial direction of the dielectric tube. The transmissive member is transparent to excitation light and allows passage of ultraviolet light therethrough. Therefore, even when the transmissive member is provided, for example, at a position as shown in FIGS. 2 to 6, excitation light can be emitted to that position to start discharge.

ASPECTS

A person skilled in the art understands that the embodiment and the modification thereof described above represent specific examples of aspects below.

(Clause 1) A dielectric barrier discharge ionization detector according to one aspect includes a dielectric tube, a high-voltage electrode, a ground electrode unit, a voltage applicator, a light source, and an electric charge collection portion. The dielectric tube defines a gas flow channel through which discharge gas flows, and extends in an axial direction. The high-voltage electrode is provided on an outer wall of the dielectric tube. The ground electrode unit is electrically grounded and provided on the outer wall of the dielectric tube. The voltage applicator is connected to the high-voltage electrode and applies an AC voltage across the high-voltage electrode and the ground electrode unit to cause discharge in the dielectric tube and to generate plasma from the discharge gas. The light source emits excitation light to the discharge gas that flows through the dielectric tube. The electric charge collection portion includes a collection electrode that collects ions generated by light from the plasma, the ions being generated from a sample component in sample gas introduced in the gas flow channel. The ground electrode unit includes a first ground electrode and a second ground electrode arranged at a distance from each other in an axial direction of the dielectric tube. The high-voltage electrode is provided between the first ground electrode and the second ground electrode. A first distance between the first ground electrode and the high-voltage electrode is shorter than a second distance between the second ground electrode and the high-voltage electrode. A cover is provided on the outer wall of the dielectric tube at a position between the first ground electrode and the high-voltage electrode. The light source is arranged to emit the excitation light such that an optical axis of the light source is directed toward a position where the cover is not provided on the outer wall of the dielectric tube.

According to such a configuration, in a configuration where the cover is provided on the outer wall of the dielectric tube, excitation light is reliably emitted to discharge gas.

(Clause 2) In the dielectric barrier discharge ionization detector described in Clause 1, the light source is arranged to emit the excitation light such that the optical axis is directed toward an end of the first ground electrode or an end of the high-voltage electrode, on a side where the cover is not provided.

According to such a configuration, since excitation light is emitted such that the optical axis is directed toward the end of the first ground electrode or the end of the high-voltage electrode on the side where the cover is not provided, excitation light is reliably emitted to discharge gas.

(Clause 3) In the dielectric barrier discharge ionization detector described in Clause 1 or 2, the light source is arranged to emit, as being inclined, the excitation light such that the optical axis is directed toward a prescribed position between the first ground electrode and the high-voltage electrode.

According to such a configuration, since the light source is arranged to emit, as being inclined, excitation light such that the optical axis is directed toward the prescribed position between the first ground electrode and the high-voltage electrode, excitation light is reliably emitted to discharge gas.

(Clause 4) In the dielectric barrier discharge ionization detector described in Clause 1, the first ground electrode includes a hole. The light source is arranged to emit the excitation light such that the optical axis is directed toward the hole.

According to such a configuration, since excitation light is emitted such that the optical axis is directed toward the hole, excitation light is reliably emitted to discharge gas.

(Clause 5) In the dielectric barrier discharge ionization detector described in any one of Clauses 1 to 4, the discharge gas is Ar gas.

According to such a configuration, in generating plasma from Ar, excitation light is reliably emitted to discharge gas.

(Clause 6) In the dielectric barrier discharge ionization detector described in any one of Clauses 1 to 5, the excitation light includes light including a wavelength equal to or shorter than 300 nm.

According to such a configuration, by emitting light including wavelengths equal to or shorter than 300 nm high in light energy, discharge can reliably be started.

(Clause 7) In the dielectric barrier discharge ionization detector described in any one of Clauses 1 to 6, the light source is an ultraviolet LED.

According to such a configuration, the light source can be constituted of components low in power consumption and long in lifetime.

(Clause 8) A dielectric barrier discharge ionization detector according to one aspect includes a dielectric tube, a high-voltage electrode, a ground electrode, a voltage applicator, a light source, an electric charge collection portion, a light shield member, and a transmissive member. The dielectric tube defines a gas flow channel through which discharge gas flows and extends in an axial direction. The high-voltage electrode is provided on an outer wall of the dielectric tube. The ground electrode is electrically grounded and provided on the outer wall of the dielectric tube. The voltage applicator is connected to the high-voltage electrode and applies an AC voltage across the high-voltage electrode and the ground electrode to cause discharge in the dielectric tube and to generate plasma from the discharge gas. The light source emits excitation light to the discharge gas that flows through the dielectric tube. The electric charge collection portion includes a collection electrode that collects ions generated by light from the plasma, the ions being generated from a sample component in sample gas introduced in the gas flow channel. The light shield member is provided on the outer wall of the dielectric tube and opaque to the excitation light. The transmissive member is provided on the outer wall of the dielectric tube at a position different from a position of the light shield member in the axial direction of the dielectric tube, and transparent to the excitation light. The light source is arranged to emit the excitation light such that an optical axis of the light source is directed toward a position where the light shield member is not provided on the outer wall of the dielectric tube.

According to such a configuration, in a configuration in which the light shield member is provided on the outer wall of the dielectric tube, excitation light is reliably emitted to discharge gas.

(Clause 9) A gas chromatography analyzer according to one aspect includes the dielectric barrier discharge ionization detector described in any one of Clauses 1 to 8 and an analysis column that separates a sample component in the sample gas for each component. The sample component separated by the analysis column is introduced in the gas flow channel of the dielectric barrier discharge ionization detector.

According to such a configuration, in a configuration in which the cover is provided on the outer wall of the dielectric tube, excitation light is reliably emitted to discharge gas.

Though an embodiment of the present disclosure has been described, it should be understood that the embodiment disclosed herein is illustrative and non-restrictive in every respect. The technical scope shown in the present disclosure is intended to include any modifications within the scope and meaning equivalent to the terms of the claims.

What is claimed is:

1. A dielectric barrier discharge ionization detector comprising:
    a dielectric tube that defines a gas flow channel through which discharge gas flows, the dielectric tube extending in an axial direction;
    a high-voltage electrode provided on an outer wall of the dielectric tube;
    a ground electrode unit electrically grounded and provided on the outer wall of the dielectric tube;
    a voltage applicator connected to the high-voltage electrode, the voltage applicator applying an AC voltage across the high-voltage electrode and the ground electrode unit to cause discharge in the dielectric tube and to generate plasma from the discharge gas;
    a light source that emits excitation light to the discharge gas that flows through the dielectric tube; and
    an electric charge collection portion including a collection electrode that collects ions generated by light from the plasma, the ions being generated from a sample component in sample gas introduced in the gas flow channel, wherein
    the ground electrode unit includes a first ground electrode and a second ground electrode arranged at a distance from each other in an axial direction of the dielectric tube,
    the high-voltage electrode is provided between the first ground electrode and the second ground electrode,
    a first distance between the first ground electrode and the high-voltage electrode is shorter than a second distance between the second ground electrode and the high-voltage electrode,
    a cover is provided on the outer wall of the dielectric tube at a position between the first ground electrode and the high-voltage electrode, and
    the light source is arranged to emit, as being inclined with respect to a direction vertical to the axis direction of the dielectric tube, the excitation light such that an optical axis of the light source is directed toward a position where the cover is not provided on the outer wall of the dielectric tube.

2. The dielectric barrier discharge ionization detector according to claim 1, wherein
    the light source is arranged to emit the excitation light such that the optical axis of the light source is directed toward an end of the first ground electrode or an end of the high-voltage electrode, on a side where the cover is not provided.

3. The dielectric barrier discharge ionization detector according to claim 1, wherein
    the first ground electrode includes a hole, and
    the light source is arranged to emit the excitation light such that the optical axis of the light source is directed toward the hole.

4. The dielectric barrier discharge ionization detector according to claim 1, wherein
the discharge gas is Ar gas.

5. The dielectric barrier discharge ionization detector according to claim 1, wherein
the excitation light is light including a wavelength equal to or shorter than 300 nm.

6. The dielectric barrier discharge ionization detector according to claim 1, wherein
the light source is an ultraviolet LED.

7. A gas chromatography analyzer comprising:
the dielectric barrier discharge ionization detector according to claim 1; and
an analysis column that separates a sample component in the sample gas for each component, wherein
the sample component separated by the analysis column is introduced in the gas flow channel of the dielectric barrier discharge ionization detector.

8. A dielectric barrier discharge ionization detector comprising:
a dielectric tube that defines a gas flow channel through which discharge gas flows, the dielectric tube extending in an axial direction;
a high-voltage electrode provided on an outer wall of the dielectric tube;
a ground electrode electrically grounded and provided on the outer wall of the dielectric tube;
a voltage applicator connected to the high-voltage electrode, the voltage applicator applying an AC voltage across the high-voltage electrode and the ground electrode to cause discharge in the dielectric tube and to generate plasma from the discharge gas;
a light source that emits excitation light to the discharge gas that flows through the dielectric tube;
an electric charge collection portion including a collection electrode that collects ions generated by light from the plasma, the ions being generated from a sample component in sample gas introduced in the gas flow channel;
a light shield member being opaque to the excitation light and provided on the outer wall of the dielectric tube between the high-voltage electrode and the ground electrode; and
a transmissive member provided on the outer wall of the dielectric tube at a position different from a position of the light shield member in the axial direction of the dielectric tube, the transmissive member being transparent to the excitation light, wherein
the light source is arranged to emit, as being inclined with respect to a direction vertical to the axis direction of the dielectric tube, the excitation light such that an optical axis of the light source is directed toward a position where the light shield member is not provided on the outer wall of the dielectric tube.

* * * * *